(12) United States Patent
Chang et al.

(10) Patent No.: US 10,712,970 B2
(45) Date of Patent: Jul. 14, 2020

(54) FLASH MEMORY CONTROLLER AND ASSOCIATED ACCESSING METHOD AND ELECTRONIC DEVICE

(71) Applicant: RayMX Microelectronics, Corp., Anhui Province (CN)

(72) Inventors: Wen-Hsin Chang, Changhua County (TW); Yen-Chung Chen, Hsinchu County (TW); Wei-Ren Hsu, Taipei (TW); Yufeng Zhou, Ningbo (CN)

(73) Assignee: RAYMX MICROELECTRONICS CORP., Hefei, Anhui Province (CN)

( * ) Notice: Subject to any disclaimer, the term of this patent is extended or adjusted under 35 U.S.C. 154(b) by 0 days.

(21) Appl. No.: 16/174,301

(22) Filed: Oct. 30, 2018

(65) Prior Publication Data

US 2020/0073582 A1 Mar. 5, 2020

(30) Foreign Application Priority Data

Sep. 3, 2018 (CN) .......................... 2018 1 1020330

(51) Int. Cl.
*G06F 13/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0679; G06F 3/0604
See application file for complete search history.

(56) References Cited

U.S. PATENT DOCUMENTS

| 7,743,203 | B2 | 6/2010 | France |
| 8,930,647 | B1 | 1/2015 | Smith |
| 2008/0209112 | A1* | 8/2008 | Yu ........................ G06F 12/0246 711/103 |
| 2008/0215800 | A1* | 9/2008 | Lee ........................ G06F 3/0613 711/103 |

(Continued)

FOREIGN PATENT DOCUMENTS

TW 200912641 A 3/2009

OTHER PUBLICATIONS

TW Office Action dated Dec. 11, 2019 in Taiwan application (No. 107137854).

*Primary Examiner* — Jing-Yih Shyu
(74) *Attorney, Agent, or Firm* — McClure, Qualey & Rodack, LLP

(57) ABSTRACT

The present invention provides a flash memory controller including an artificial intelligence (AI) module and a microprocessor. In the operations of the flash memory controller, the AI module receives data from a host device, and determines if the data is important data or unimportant data to generate a determination result. The microprocessor is configured to write the data into a flash memory module according to the determination result, wherein the flash memory module comprises a plurality of first blocks and a plurality of second blocks, and quantity of bits stored in each memory cell within the first blocks is lower than quantity of bits stored in each memory cell within the second blocks. When the determination result indicates that the data is the important data, the microprocessor only stores the data into at least one of the first blocks.

18 Claims, 3 Drawing Sheets

(56) References Cited

U.S. PATENT DOCUMENTS

| | | |
|---|---|---|
| 2009/0043831 A1 | 2/2009 | Antonopoulos et al. |
| 2009/0089610 A1 | 4/2009 | Rogers et al. |
| 2010/0070688 A1* | 3/2010 | Lin .................... G06F 12/0246 |
| | | 711/103 |
| 2011/0280074 A1* | 11/2011 | Lin ........................ G11C 16/10 |
| | | 365/185.11 |
| 2013/0326125 A1* | 12/2013 | Chang ................ G06F 12/0246 |
| | | 711/103 |
| 2016/0179430 A1* | 6/2016 | Kong .................... G06F 3/0631 |
| | | 711/102 |
| 2016/0306570 A1 | 10/2016 | Ryan et al. |
| 2017/0229030 A1* | 8/2017 | Aguayo, Jr. ............. G09B 7/02 |
| 2018/0373626 A1* | 12/2018 | Sun .................... G06F 12/0638 |
| 2019/0034763 A1* | 1/2019 | Guim Bernat ....... G06K 9/6257 |

\* cited by examiner

FLASH MEMORY CONTROLLER AND ASSOCIATED ACCESSING METHOD AND ELECTRONIC DEVICE

BACKGROUND OF THE INVENTION

1. Field of the Invention

The present invention relates to a flash memory controller.

2. Description of the Prior Art

Generally, data stored in a storage medium includes operating system, file system and other data (e.g. photo, video, . . . etc.). When the data in the storage medium is lost or damaged, if the data belongs to the operating system or the file system, it is likely to cause damage to the system, and may require to re-install the operating system. On the other hand, if the data is a file such as the photo or video data, the damage may be that the photo cannot be read or the file cannot be opened, that is the damage is quite slight and not influence the operating system.

In addition, the above-mentioned storage medium may be a flash memory module, where the flash memory module may have one or more types of blocks such as single-level cell (SLC) blocks, multi-level cell (MLC) blocks, triple-level cell (TLC) blocks and/or quadruple-level cell (QLC) blocks, and the data stability and the life of each block are different. For example, the TLC blocks have greater storage capacity, but the data stability, error rates and allowable erase count are worse. Therefore, if the data of the operating system and the file system is stored in the TLC blocks, there is a higher probability that the important data is damaged, causing great trouble to the user.

SUMMARY OF THE INVENTION

It is therefore an objective of the present invention to provide a flash memory controller, which can determine if the data belongs to import data or unimportant data, and write the important into the SLC blocks or other blocks with higher data stability, to solve the above-mentioned problems.

In a first embodiment of the present invention, a flash memory controller comprising an artificial intelligence (AI) module and a microprocessor is disclosed. In the operations of the flash memory controller, the AI module receives data from a host device, and determines if the data is important data or unimportant data to generate a determination result. The microprocessor is configured to write the data into a flash memory module according to the determination result, wherein the flash memory module comprises a plurality of first blocks and a plurality of second blocks, and quantity of bits stored in each memory cell within the first blocks is lower than quantity of bits stored in each memory cell within the second blocks. When the determination result indicates that the data is the important data, the microprocessor only stores the data into at least one of the first blocks.

In a second embodiment of the present invention, an electronic device comprising a flash memory module and a flash memory controller is disclosed, wherein the flash memory controller comprising an AI module and a microprocessor is disclosed. In the operations of the flash memory controller, the AI module receives data from a host device, and determines if the data is important data or unimportant data to generate a determination result. The microprocessor is configured to write the data into a flash memory module according to the determination result, wherein the flash memory module comprises a plurality of first blocks and a plurality of second blocks, and quantity of bits stored in each memory cell within the first blocks is lower than quantity of bits stored in each memory cell within the second blocks. When the determination result indicates that the data is the important data, the microprocessor only stores the data into at least one of the first blocks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
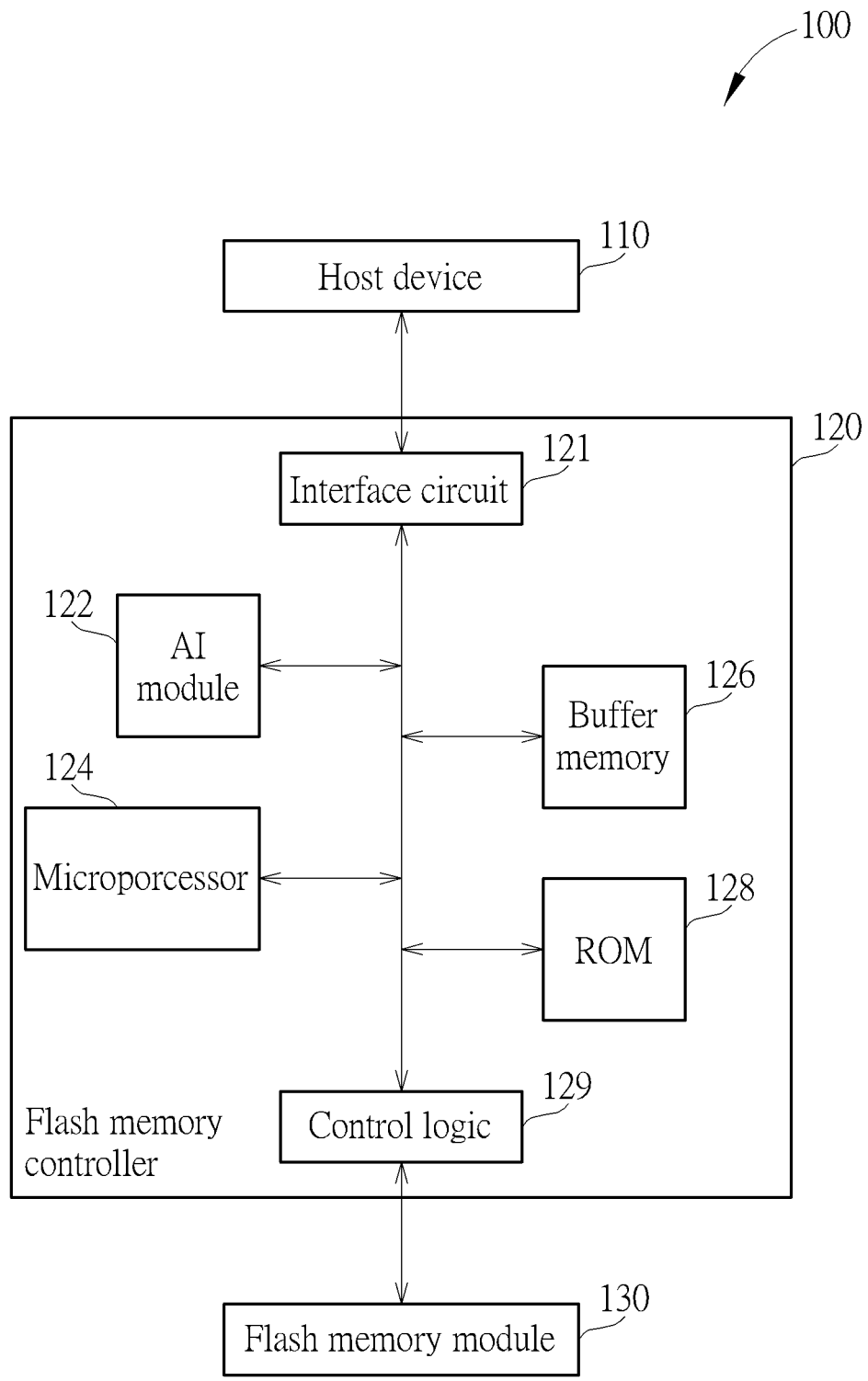
FIG. 1 is a diagram illustrating an electronic device according to one embodiment of the present invention.

FIG. 1 is a diagram illustrating an electronic device 100 according to one embodiment of the present invention. As shown in FIG. 1, the electronic device 100 comprises a host device 110, a flash memory controller 120 and a flash memory module 130, where the flash memory controller 120 comprises an interface circuit 121, an AI module 122, a microprocessor 124, a buffer memory 126, a read only memory (ROM) 128 and a control logic 129. The ROM 128 is used to store program codes, and the microprocessor 124 is configured to execute the program codes to control the access of the flash memory module 130, and the elements within the flash memory controller 120 may communicate with each other via buses shown in FIG. 1. In this embodiment, the flash memory controller 120 and the flash memory module 130 can be regarded as a solid-state drive (SSD), the electronic device 100 can be any computer or server having the SSD, and the host device 110 can be a processor configured to access the flash memory module 130 via the flash memory controller 120.

Figure 2:
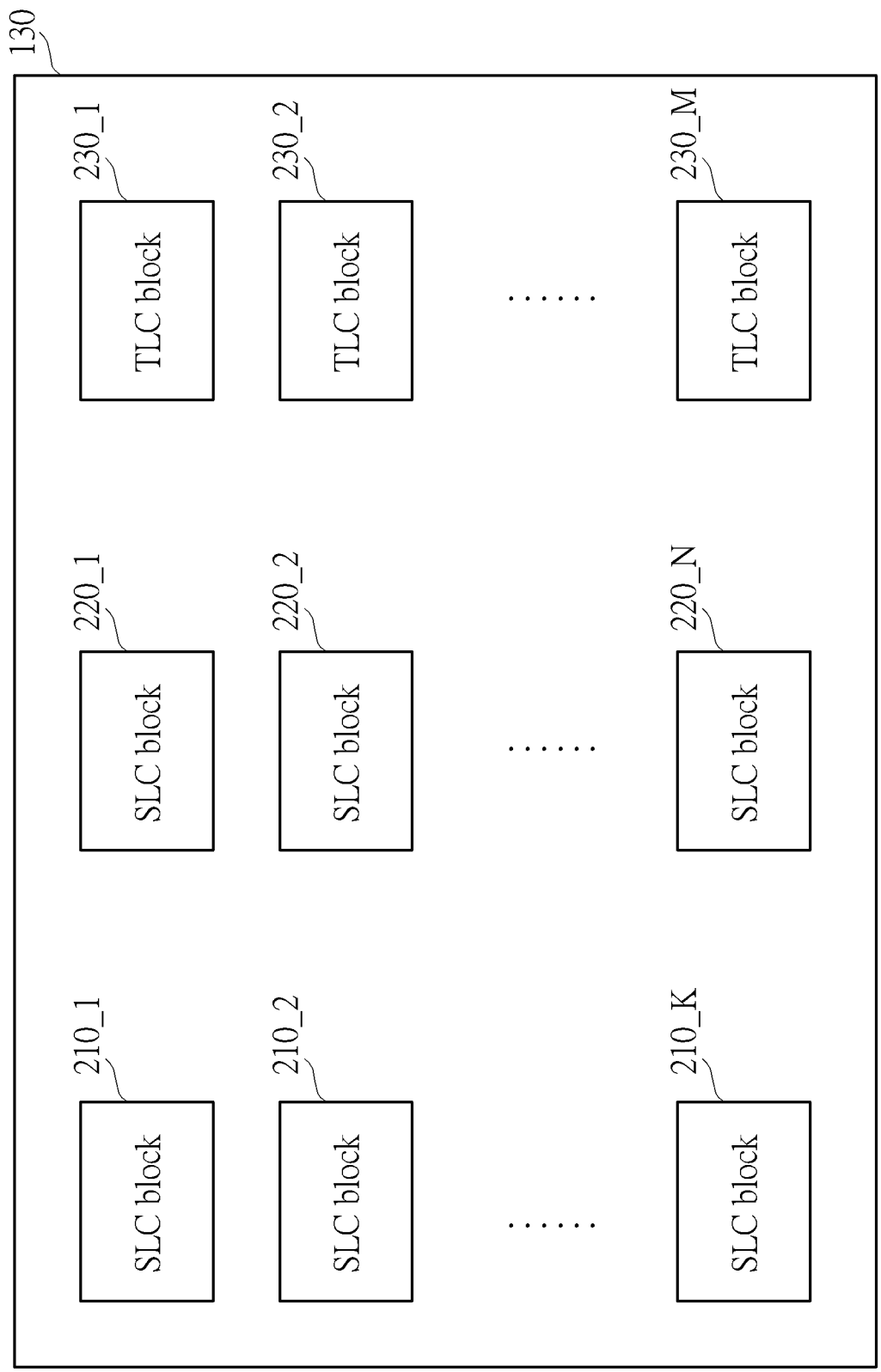
FIG. 2 shows different types of blocks within the flash memory module.

The flash memory module 130 comprises at least one flash memory chip, each flash memory chip comprises a plurality blocks, each block comprises a plurality of pages. In the designs of the flash memory, each block is a minimum erasing unit, that is all the data within the block must be erased together, and only deleting a portion of the data of the block is not allowed. In addition, each page is a minimum writing unit. In addition, the flash memory module 130 comprises a plurality of first blocks with higher stability, a plurality of second blocks with lower stability, and a plurality of temporary blocks. For the convenience of the following descriptions, the first blocks are SLC blocks, the second blocks are TLC blocks, and the temporary blocks are SLC blocks, but it is not a limitation of the present invention. Specifically, FIG. 2 shows that the flash memory module 130 comprises a plurality of SLC blocks 210_1-210_K and 220_1-220_N and a plurality of TLC blocks 230_1-230_M, wherein each memory cell (e.g. a floating gate transistor) of the SLC blocks 210_1-210_K and 220_1-220_N is used to store only one bit, and each memory cell of the TLC blocks 230_1-230_M can be used to store three bits. Because the write characteristics of the SLC blocks 210_1-210_K and 220_1-220_N and the TLC blocks 230_1-230_M, data stability and the data error rates of the SLC blocks 210_1-210_K and 220_1-220_N are much better than the TLC blocks 230_1-230_M, and the allowable erase count or P/E cycle of the TLC blocks 230_1-230_M is much less than the allowable erase count or P/E cycle of the SLC blocks 210_1-210_K and 220_1-220_N, that is the TLC blocks 230_1-230_M have shorter life.

In this embodiment, the SLC blocks 220_1-220_N serve as the temporary blocks when the flash memory controller 120 writes data into the TLC blocks 230_1-230_M, that is the valid data within the SLC blocks 220_1-220_N will be moved to the TLC blocks 230_1-230_M in the following garbage collection operations. In addition, the SLC blocks 210_1-210_K serve as the data blocks instead of the temporary blocks, that is the data written into the SLC blocks 210_1-210_K will not be moved to the TLC blocks 230_1-230_M (i.e., if the valid data is required to be moved, the valid data is only moved to another SLC block).

In the operations of the electronic device 100, when the host device 110 needs to write data into the flash memory module 130, the host device 110 transmits a write command and the data to the interface circuit 121 of the flash memory controller 120. Then, the AI module 122 determines if the data belongs to important data or unimportant data to generate a determination result, where the important data means the data of the operating system, file system and computer software, and the unimportant data means the video data, photo and the document files. Then, the microprocessor 124 refers to the determination result to determine if writing the data into the SLC blocks 210_1-210_K directly. Specifically, if the determination result indicates that the data is the important data, the microprocessor 124 directly writes the data into the SLC blocks 210_1-210_K via an encoder and a randomizer within the control logic 129. If the determination result indicates that the data is the unimportant data, the microprocessor 124 writes the data into the SLC blocks 220_1-220_N serving as the temporary blocks via the control logic 129, then the valid data of the SLC blocks 220_1-220_N will be moved to the TLC blocks 230_1-230_M by performing the garbage collection operations.

In another embodiment of the present invention, the flash memory module 130 does not comprises the SLC blocks 220_1-220_N serving as the temporary blocks. That is, if the determination result indicates that the data is the unimportant data, the microprocessor 124 directly writes the data into the TLC blocks 230_1-230_M via the control logic 129.

In light of above, because the important data is written into the SLC blocks 210_1-210_K with higher stability and long life, and in one embodiment the data stored in the SLC blocks 210_1-210_K will not move to any different type of blocks (e.g. TLC blocks) in any operation of the flash memory controller 120. Therefore, the chances of damage to these important data can be greatly reduced. In addition, because the unimportant data is directly written into the TLC blocks 230_1-230_M having greater storage capacity, the space of the flash memory module 130 can be used efficiently.

In a first embodiment, the AI module 122 may refer to a physical address of the flash memory module 130 associated with the data to determine if the data belongs to the important data or the unimportant data to generate the determination result. Specifically, because the data corresponding to the operating system is installed when the flash memory module 130 is initially used, the data stored in the blocks having the previous physical addresses (e.g., the blocks or the physical addresses having smaller sequence numbers or smaller indexes) can be regarded as the important data. Therefore, the AI module 122 can determine if the data is associated with the information/data within a specific range of the physical addresses to generate the determination result, for example, the AI module 122 can determine if the data is used to update the information/data within the specific range of the physical addresses.

In a second embodiment, because the data of the operating system and the file system is read and written frequently, the AI module 122 can refer to an access frequency of the data asked to be written by the host device 110 to determine if the data belongs to the important data or the unimportant data. For example, the AI module 122 may calculate the access frequency according to a write count of a logical address corresponding to the data within a past period of time (e.g. several hours or one day), that is the AI module 122 calculates the write frequency for the same logical address. Then, if the access frequency of the data is greater than a threshold value, the AI module 122 determines that the data is the important data; and if the access frequency of the data is not greater than a threshold value, the AI module 122 determines that the data is the unimportant data.

In a third embodiment, the AI module 122 may refer to a size of the data to be written into the flash memory module 130 to determine if the data belongs to the important data or the unimportant data to generate the determination result. Specifically, the updating of the data corresponding to the operating system generally has less data amount, so if the amount of the data is minimum amount transmitted by the host device 110 (e.g. 4 kilobytes), the AI module 122 can determine that the data is the important data.

In a fourth embodiment, the AI module 122 may determine if a logical address corresponding to the data from the host device 110 is written into the flash memory module 130 frequently when the electronic device 100 powers on and powers off, to determine if the data belongs to the important data or the unimportant data to generate the determination result. For example, the data written into the flash memory module 130 when the electronic device 100 powers on or off is generally the important system data or file, so if the logical address corresponding to the data is often written into the flash memory module 130 (e.g. the write frequency or the write count is greater than a threshold value) within a period of time after the electronic device 100 powers on or within a period of time before the electronic device 100 powers off, the AI module 122 can determine that the data is the important data.

It is noted that the above-mentioned four embodiments can be simultaneously used in the determination mechanism of the AI module 122. That is, as long as the data is associated with the information/data within a specific range of the physical addresses, or the access frequency of the data is greater than a threshold, or the amount of the data is minimum amount transmitted by the host device 110, or the logical address corresponding to the data is often written into the flash memory module 130 when the electronic device 100 powers on or off, the AI module 122 determines that the data is the important data.

In one embodiment, the AI module 122 is trained to determine a plurality of decision logics when the flash memory controller 120 is in an off-line state, and the AI module 122 uses the plurality of decision logics to determine if the data belongs to the important data or the unimportant data to generate the determination result when the flash memory controller 120 is in an on-line state. For example, when the flash memory controller 120 is in the off-line state (i.e. the flash memory controller 120 does not connect to the flash memory module 130 yet), engineers can input the simulated system data or other important data into the AI module 122 for the training operations to determine a portion of the decision logics, where the portion of the decision logics may be the physical addresses corresponding to the important data stored in the flash memory module 130, the threshold of the write frequency for determining the important data, and/or the data amount distribution of the important data, and/or the access times of the important data. Similarly, the engineers may input the simulated photo, video data or other unimportant data into the AI module 122 for the training operations to determine another portion of the decision logics for determines the characteristics of the unimportant data.

It is noted that the SLC blocks 210 1-210 K and 220 1-220 N and the TLC blocks 230 1-230 M included in the flash memory module 130 shown in FIG. 2, and the microprocessor 124 refers to the determination result of the AI module 122 to write the important data and the unimportant data into the SLC blocks 210 1-210 K and the TLC blocks 230 1-230 M, respectively in the embodiment are for illustrative purposes only. In other embodiments of the present invention, the flash memory module 130 can comprise at least two types of blocks including the SLC blocks, MLC blocks, TLC blocks and QLC blocks, and the microprocessor 124 may directly write the important data into the MLC block, the microprocessor 124 may directly write the unimportant data into the TLC blocks or QLC blocks, or write the unimportant data into the TLC blocks or QLC blocks via the temporary blocks.

Figure 3:
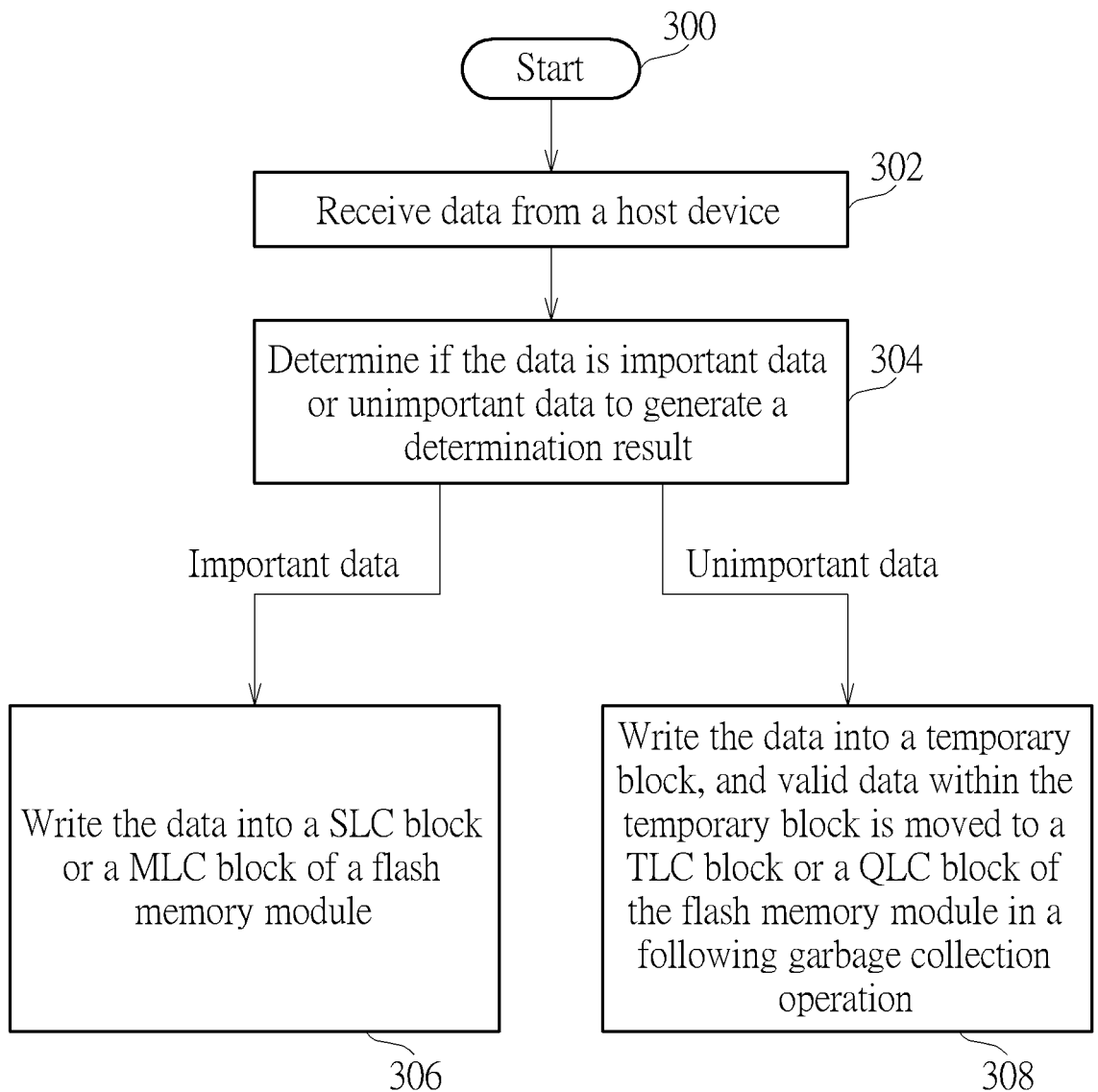
FIG. 3 is a flowchart of a method for accessing the flash memory module according to one embodiment of the present invention.

FIG. 3 is a flowchart of a method for accessing the flash memory module 130 according to one embodiment of the present invention. Refer to FIG. 1, FIG. 2 and the above disclosure, the flow is described as follows.

Step 300: the flow starts.
Step 302: receive data from a host device.
Step 304: determine if the data is important data or unimportant data to generate a determination result. When the determination result indicates that the data is the important data, the flow enters Step 306; and if the determination result indicates that the data is the unimportant data, the flow enters Step 308.
Step 306: write the data into a SLC block or a MLC block of a flash memory module.
Step 308: write the data into a temporary block, and valid data within the temporary block is moved to a TLC block or a QLC block of the flash memory module in a following garbage collection operation.

Briefly summarized, in the flash memory controller of the present invention, the AI module is provided to determine if the data from the host device is important or unimportant, and the microprocessor refers to the determination result of the AI module to write the important data into the block with higher stability (e.g. SLC block). By using the embodiments of the present invention, the chances of damage to the important data can be significantly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A flash memory controller for receiving data from a host device, comprising:
an artificial intelligence (AI) module, configured to determine whether the data is important data or unimportant data and to generate a determination result accordingly;
a microprocessor, coupled to the AI module, configured to determine whether to write the data into at least one of a plurality of first blocks of a first memory type of a flash memory module according to the determination result, wherein the flash memory module comprises the plurality of first blocks and a plurality of second blocks of a second memory type, and quantity of bits stored in each memory cell within the first blocks is lower than quantity of bits stored in each memory cell within the second blocks;
wherein when the determination result indicates the data is important data, the microprocessor only stores the data into at least one of the first blocks,
wherein the flash memory module further comprises a temporary block and the temporary block is a single-level cell (SLC) block, wherein when the determination result indicates that the data is the unimportant data, the microprocessor temporarily stores the data in the temporary block in the flash memory module until a following garbage collection operation, and the microprocessor moves the data from the temporary block to the at least one of the second blocks in the following garbage collection operation.

2. The flash memory controller of claim 1, wherein the first blocks are single-level cell (SLC) blocks, and the second blocks are multi-level cell (MLC) blocks, triple-level cell (TLC) blocks or quadruple-level cell (QLC) blocks.

3. The flash memory controller of claim 1, wherein when the determination result indicates that the data is the important data, the microprocessor only stores the data into the first blocks of the flash memory module, and the data stored in the first blocks is not moved to any block different from the first blocks in any operation of the flash memory controller.

4. The flash memory controller of claim 1, wherein when the determination result indicates that the data is the unimportant data, the microprocessor writes the data into at least one of the second blocks of the flash memory module.

5. The flash memory controller of claim 1, wherein the AI module refers to a physical address of the flash memory module associated with the data to determine if the data is the important or the unimportant data, to generate the determination result.

6. The flash memory controller of claim 1, wherein the AI module refers to an access frequency of a logical address corresponding to the data to determine if the data is the important or the unimportant data to generate the determination result.

7. The flash memory controller of claim 1, wherein the AI module refers to a size of the data to determine if the data is the important or the unimportant data to generate the determination result.

8. The flash memory controller of claim 1, wherein the AI module is trained to determine a plurality of decision logics in an off-line state of the flash memory controller, and the AI module uses the plurality of decision logics to determine if the data is the important data or the unimportant data to generate the determination result in an on-line state of the flash memory controller.

9. A method for accessing a flash memory module, comprising:
receiving data from a host device;

determining whether the data is important data or unimportant data and generating a determination result accordingly; and when the determination result indicates that the data is the important data, only writing the data into at least one of a plurality of first blocks of a first memory type of the flash memory module, wherein the flash memory module comprises the plurality of first blocks and a plurality of second blocks of a second memory type, and quantity of bits stored in each memory cell within the first blocks is lower than quantity of bits stored in each memory cell within the second blocks, wherein when the determination result indicates the data is important data, a microprocessor only stores the data into at least one of the first blocks, wherein the flash memory module further comprises a temporary block and the temporary block is a single-level cell (SLC) block, and the method further comprises:

when the determination result indicates that the data is the unimportant data, writing the data into the temporary block in the flash memory module, wherein the data is temporarily stored in the temporary block until a following garbage collection operation; and moving the data from the temporary block to the at least one of the second blocks in the following garbage collection operation.

10. The method of claim 9, wherein the first blocks are single-level cell (SLC) blocks, and the second blocks are multi-level cell (MLC) blocks, triple-level cell (TLC) blocks or quadruple-level cell (QLC) blocks.

11. The method of claim 9, wherein the method is executed by a flash memory controller, and the method further comprises:

when the determination result indicates that the data is the important data, only writing the data into the first blocks of the flash memory module, wherein the data stored in the first blocks is not moved to any block different from the first blocks in any operation of the flash memory controller.

12. The method of claim 9, further comprising:

when the determination result indicates that the data is the unimportant data, writing the data into at least one of the second blocks of the flash memory module.

13. The method of claim 9, wherein the step of determining if the data is the important data or the unimportant data to generate the determination result comprises:

referring to a physical address of the flash memory module associated with the data to determine if the data is the important or the unimportant data, to generate the determination result.

14. The method of claim 9, wherein the step of determining if the data is the important data or the unimportant data to generate the determination result comprises:

referring to an access frequency of a logical address corresponding to the data to determine if the data is the important or the unimportant data to generate the determination result.

15. The method of claim 9, wherein the step of determining if the data is the important data or the unimportant data to generate the determination result comprises:

referring to a size of the data to determine if the data is the important or the unimportant data to generate the determination result.

16. The method of claim 9, wherein the method is executed by a flash memory controller, and the method comprises:

determining a plurality of decision logics in an off-line state of the flash memory controller; and the step of determining if the data is the important data or the unimportant data to generate the determination result comprises:

using the plurality of decision logics to determine if the data is the important data or the unimportant data to generate the determination result in an on-line state of the flash memory controller.

17. An electronic device, comprising:

a flash memory module; and a flash memory controller, for receiving data from a host device and accessing the flash memory module, wherein the flash memory controller comprises:

an artificial intelligence (AI) module, configured to determine whether the data is important data or unimportant data and to generate a determination result accordingly; and a microprocessor, coupled to the AI module, configured to determine whether to write the data into a plurality of first blocks of a first memory type of the flash memory module according to the determination result, wherein the flash memory module comprises the plurality of first blocks and a plurality of second blocks of a second memory type, and quantity of bits stored in each memory cell within the first blocks is lower than quantity of bits stored in each memory cell within the second blocks;

wherein when the determination result indicates the data is important data, the microprocessor only stores the data into at least one of the first blocks, wherein the flash memory module further comprises a temporary block and the temporary block is a single-level cell (SLC) block, wherein when the determination result indicates that the data is the unimportant data, the microprocessor temporarily stores the data in the temporary block in the flash memory module until a following garbage collection operation, and the microprocessor moves the data from the temporary block to the at least one of the second blocks in the following garbage collection operation.

18. The electronic device of claim 17, wherein the first blocks are single-level cell (SLC) blocks, and the second blocks are multi-level cell (MLC) blocks, triple-level cell (TLC) blocks or quadruple-level cell (QLC) blocks; and when the determination result indicates that the data is the important data, the microprocessor only stores the data into the first blocks of the flash memory module, and the data stored in the first blocks is not moved to any block different from the first blocks in any operation of the flash memory controller.

* * * * *